Patented Apr. 3, 1923.

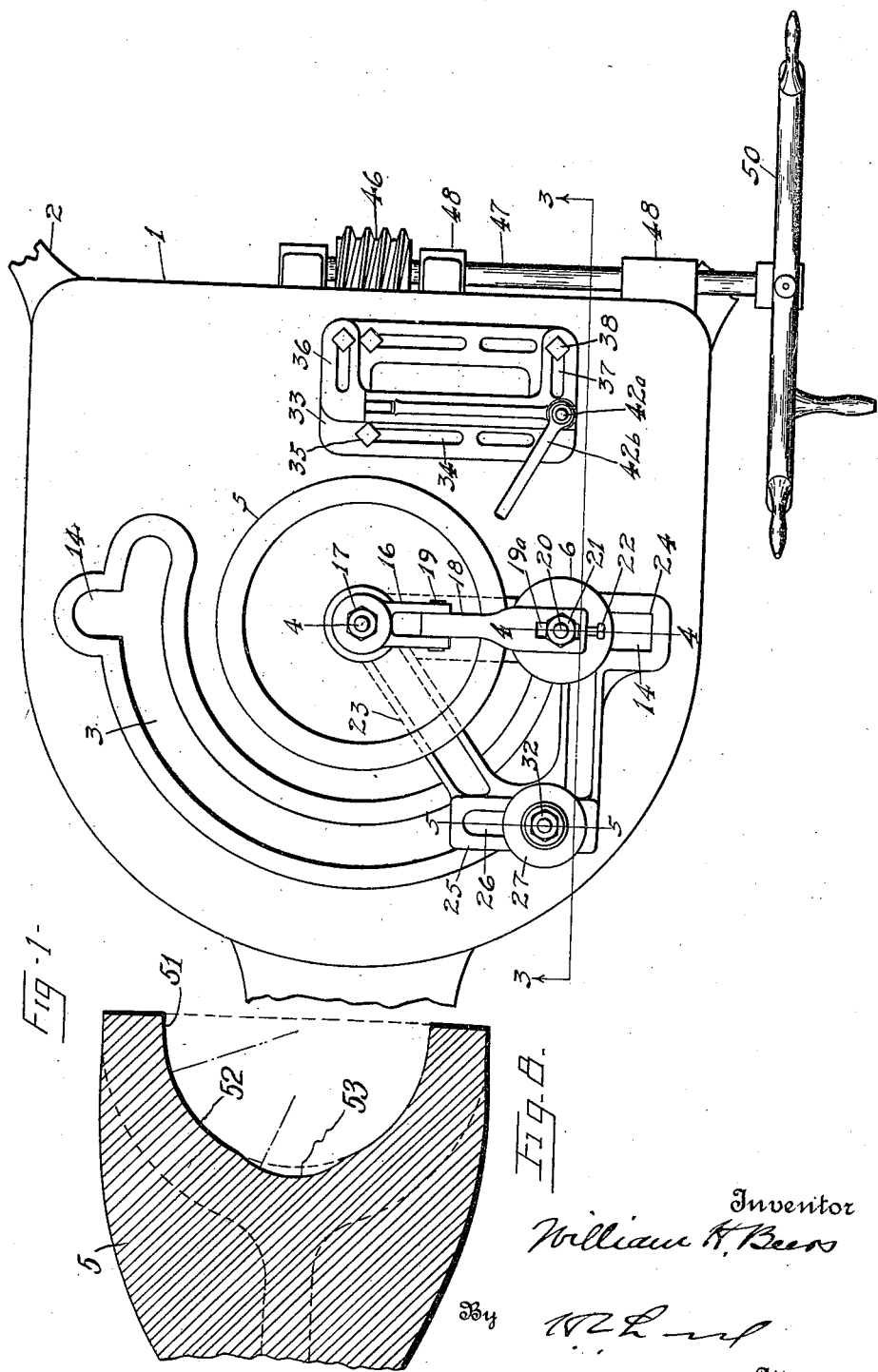

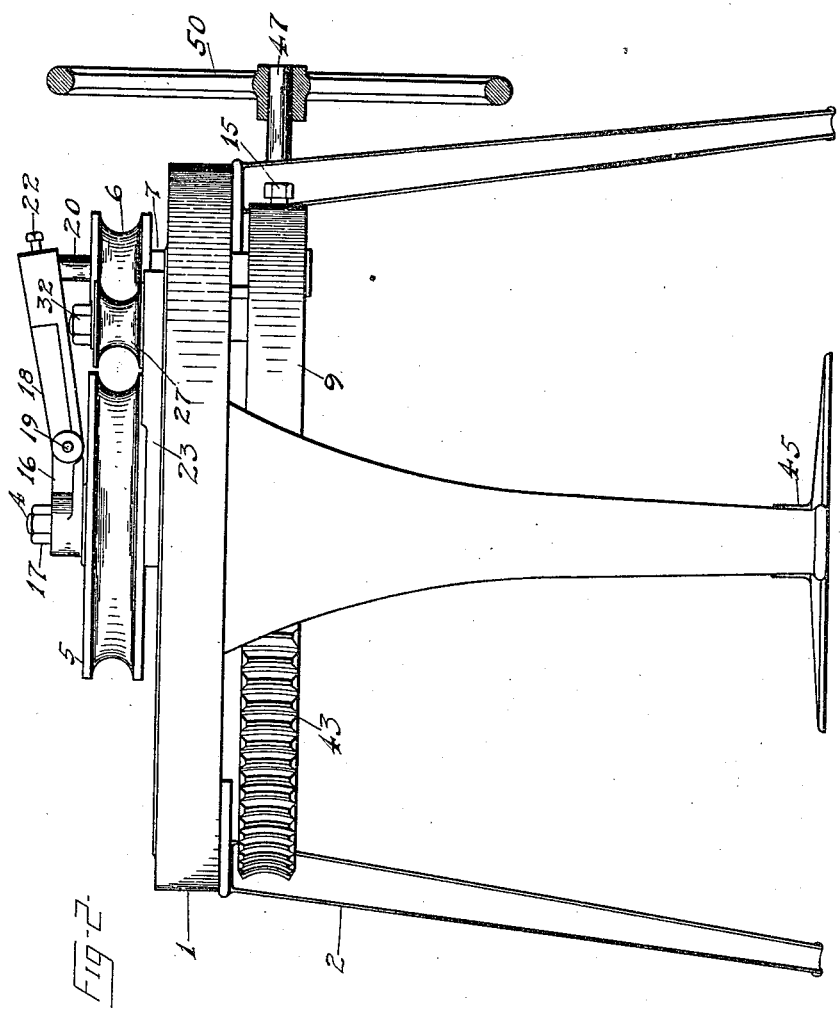

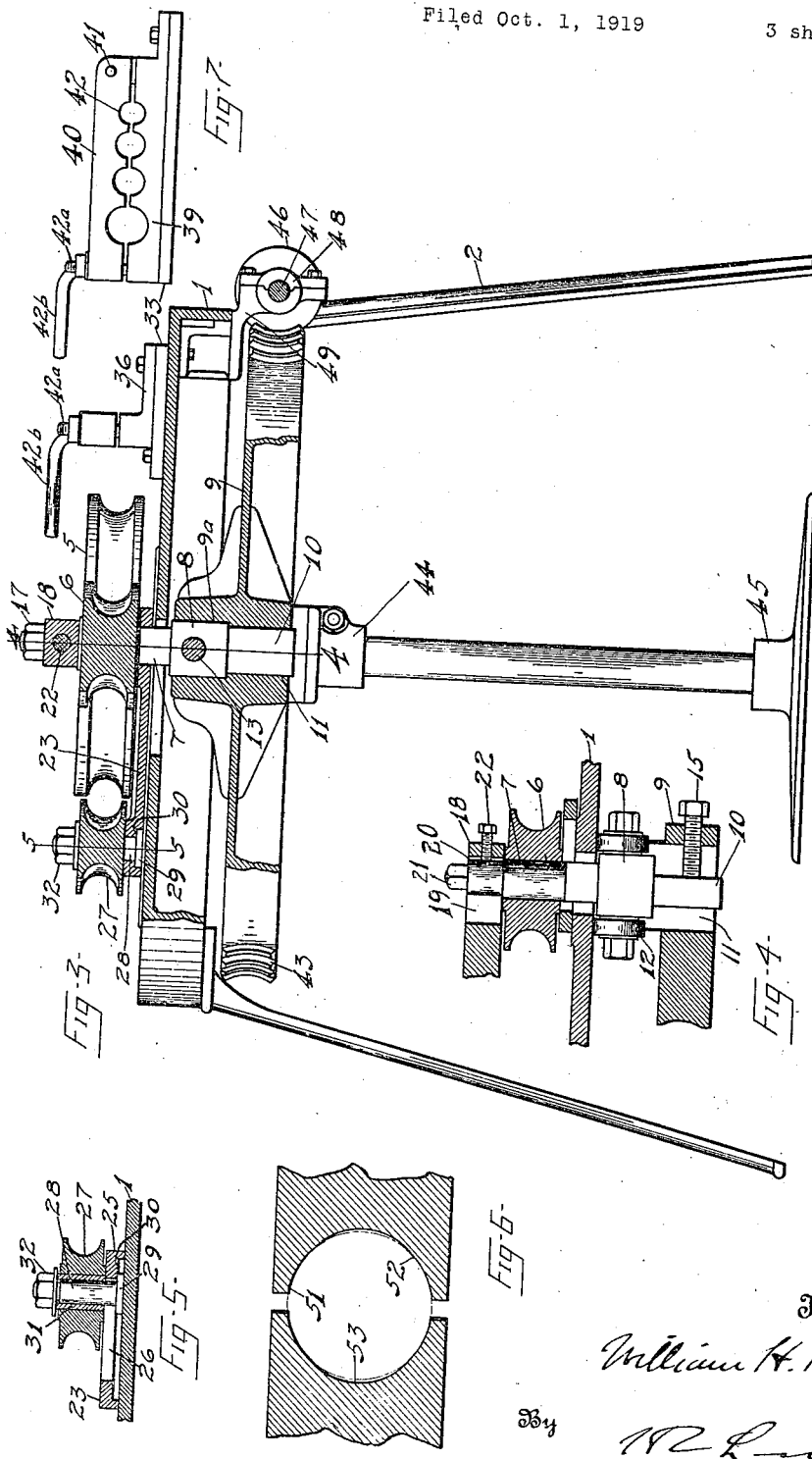

1,450,317

UNITED STATES PATENT OFFICE.

WILLIAM H. BEERS, OF PORTLAND, OREGON.

PIPE-BENDING MACHINE.

Application filed October 1, 1919. Serial No. 327,631.

*To all whom it may concern:*

Be it known that I, WILLIAM H. BEERS, a citizen of the United States, residing at Portland, in the county of Multnomah and State of Oregon, have invented new and useful Improvements in Pipe-Bending Machines, of which the following is a specification.

The invention is particularly designed to bend pipes leaving the pipe in perfect condition at the bend; to provide a machine in which different sizes of pipe may be readily taken care of; and to provide the machine with sufficient power so that the effort of bending is reduced.

The invention is illustrated in the accompanying drawings as follows:—

Fig. 1 shows a plan view of the machine.
Fig. 2 a side elevation of the machine.
Fig. 3 a section on the line 3—3 in Fig. 1.
Fig. 4 a section on the lines 4—4 in Figs. 1 and 3.
Fig. 5 a section on the lines 5—5 in Figs. 1 and 3.
Fig. 6 an enlarged view showing the construction of the bending sheave grooves.
Fig. 7 a view of the clamp.
Fig. 8 is an enlarged sectional view showing the contour of the bending groove in the sheaves.

1 marks the frame which is in the form of a table and having the supporting legs 2. The table has a circular slot 3 through it which is concentric with an upright shaft 4. A bending sheave or body 5 is journaled on the shaft 4. The pipe is engaged between the sheave 5 and a swinging sheave 6. The sheave 6 is mounted on a post 7 which extends slightly above the sheave and through the slot 3. The post has a squared portion 8 which operates between the guide ways 9$^a$ on a guide wheel 9, the guide ways forming a guiding slot between them and the squared portion has an extension 10 with flat surfaces operating in the slot 11. This extended driving surface is intended to maintain the post 7 in an upright position. The length of the driving surface up and down it will be noted is greater than the distance between the upper end of the driving surface and the center of the groove of the sheave so that the engaging surfaces on the post are ample to maintain the post against the driving thrust of the wheel. Rollers 12 are journaled on pins 13 extending from the guide block 8, the rollers being positioned to operate on the underside of the table adjacent to the groove or slot 3. The post is adjusted and locked in position by a set screw 15 which extends through the outer surface of the wheel against the extension 10. A pivotal mounting 16 is arranged on the top of the shaft 4 and secured in place thereon by a nut 17, the same nut securing the sheave 5. An arm 18 is pivotally connected by a pin 19 with the mounting 16 and has a slot 19$^a$ in its outer end adapted to drop over the reduced upper end 20 of the post 7. A nut 21 is provided on the extension 20 for locking the arm 18 in position and the adjusting nut operates against the post so as to adjust and lock the post radially and to adjust the sheaves 6 with relation to the sheave 5. It will be understood that the post 7 is moved outwardly or radially when it is desired to remove the pipe or move the pipe in the groove and the slot 3 has radial extensions 14 at its ends which will permit the radial movement of the post for this purpose. It will be observed that the arm 18 and the wheel 9 are carried by the same shaft 4 and that the post is locked against radial movement by the screws 22 and 15 so that the shaft is fully secured against the thrust to which it is subjected in bending the pipe.

It is desirable to lead the pipe with a lead sheave so as to relieve the pipe from crushing strain in bending. In the present instance this is driven through an arm 23, the arm being pivotally mounted on the shaft 4. This arm 23 is provided at one point with a slot 24 through which the post 7 extends so that the arm is driven by and with the post 7 and wheel 9. The arm is provided with a guide way 25 in which is arranged a guide slot 26. A lead sheave 27 is mounted on a post 28. This post extends through the slot 26 and has a head 29 which operates in the grooves 30 on the underside of the arm. A distance bushing 31 is arranged over the post 28 and within the sheave 27 and rests against the top of the arm 25. A nut 32 on the post 28 operates against the bushing clamping the arm between the head 29 and the bushing, thus securing the post in any adjustment desired. This adjustment is necessary for different bends and also may be desirable in assisting to remove the pipe.

The pipe is clamped in position and it will be understood that different sizes of sheaves 5 and 6 may be used so as to give different curvatures or bend. The clamp 36 is mounted on a plate 33. The plate 33 is provided with slots 34 through which the screws 35 extend for clamping the plate on the table. The clamp 36 has slots 37 through which screws 38 extend for securing it movably on the plate 33. The clamp has the lower jaw 39 provided with openings for different sizes of pipe and with a hinged jaw 40 pivotally mounted on the jaw 39 by a pin 41 and provided with seats 42 for different sizes of pipe opposite similar seats in the jaw 39. A bolt 42ª extends through the hinged jaw and is provided with a handle nut 42ᵇ by means of which the hinged jaw may be clamped on the pipe.

The wheel 9 has a segment of a worm gear 43 which meshes with a worm 46 mounted on a shaft 47. The shaft is journaled in the bearings 48. The bearings are carried by the brackets 49 secured to the frame. A hand wheel 50 is fixed on the shaft 47 by means of which the worm gear may rotate to effect the bending of the pipe.

In order to ease the pipe I prefer to form grooves in sheaves 5 and 6 as clearly shown in Figs. 6 and 8, the groove having a portion 51 which extends straight in from the face of the sheave, the curved portion 52 approximating the curvature of the pipe and a portion 53 which extends inwardly from the curvature 52 extended. In this way the top and bottom of the pipe are engaged by straight portions which prevent any bulging of the pipe and the pipe is eased at the bottom of the groove.

What I claim as new is:—

1. In a pipe bending machine, the combination of a curved grooved bending body; a grooved bending sheave; a driving wheel having an axis coincident with the axis of the body; a bearing post for the sheave; a sliding mounting on the wheel for the post, said mounting having driving surfaces adapted to drive the post in a circumferential direction with the wheel, said driving surfaces having a driving engagement with the post for a greater distance lengthwise of the post than the distance between the top of the driving surfaces and the center of the groove of the sheave; and means for driving the wheel.

2. In a pipe bending machine, the combination of a table having a curved slot therein; a curved grooved bending body concentric with the slot; a grooved bending sheave; a driving wheel having an axis coincident with the axis of the body; a post mounted on the driving wheel and extending through the slot on which the sheave is mounted; and means for adjusting the post on the driving wheel.

3. In a pipe bending machine, the combination of a table having a curved slot therein; a grooved bending body carried by the table and having an axis coincident with the slot; a bending sheave; a drive wheel below the table having an axis coincident with the axis of the body; a post carried by the wheel and extending through said slot and on which said sheave is mounted, said post having a sliding mounting on the wheel comprising means for locking the post against rotation relatively to the wheel; and rollers fixed on the post and engaging the table adjacent to the slot.

4. In a pipe bending machine, the combination of a table having a slot therein; a grooved bending body mounted on the table; a sheave operating in relation to the bending body; a drive wheel arranged below the table and having a slotted guide-way therein; a post arranged in the guideway extending through the slot on which the sheave is mounted; and rollers arranged in the guide slot journaled on the post and adapted to engage the underside of the table.

5. In a pipe bending machine, the combination of a table having a curved slot therein; a bending body mounted on the table; a bending sheave operating in relation to the body; a post on which the sheave is mounted extending through the slot; a drive wheel arranged below the table on which the post is mounted; and an arm mounted concentrically with the wheel and engaging the post above the table.

6. In a pipe bending machine, the combination of a table having a curved slot therein; a bending body mounted on the table; a bending sheave operating in relation to the body; a post on which the sheave is mounted extending through the slot; a drive wheel arranged below the table on which the post is mounted; and an arm mounted concentrically with the wheel above the sheave and detachably secured to the post.

7. In a bending machine, the combination of a table having a curved slot therein; a bending body mounted on the table; a bending sheave operating in relation to the body; a post on which the sheave is mounted extending through the slot; a drive wheel arranged below the table on which the post is mounted; an arm mounted concentrically with the wheel above the sheave; and means on the arm and wheel for adjusting the post relatively to the axis of the wheel.

8. In a pipe bending machine, the combination of a table having a curved slot therein; a grooved bending body mounted on the table concentric with the slot; a sheave; a post on which the sheave is mounted extending through the slot; a wheel arranged below the table and having a slot in which the post is mounted; an arm above the sheave mounted concentrically with the wheel and having a slot in which the post is mounted; and means for adjusting the post in said slots.

9. In a pipe bending machine, the combination of a table having a curved slot therein; a curved grooved bending body above the table; a grooved bending sheave; a driving wheel below the table having an axis coincident with the axis of the body; a bearing post for the sheave extending through the slot in the table; a sliding mounting on the wheel for the post; means for adjusting the post in the mounting; means for driving the wheel; a lead sheave above the table and in the plane of the grooved bending sheave; and means driven by the post for driving the lead sheave.

10. In a pipe bending machine, the combination of a table having a curved slot therein; a curved bending body above the table; a bending sheave above the table; a swinging mounting above the table for the bending sheave, said mounting being concentric with the curved bending body; a lead sheave; a mounting for the lead sheave above the table swinging on an axis coincident with the axis of the curved body; means for adjusting the lead sheave with relation to the axis of the curved body comprising a slotted arm carried by the mounting; a post slidingly mounted in the arm; a distance piece arranged on the post and on which the sheave is journaled; and means operating on the distance piece for clamping the slotted arm in relation to the post.

11. In a pipe bending machine, the combination of a grooved bending body curved to the bend of the pipe; and a sheave operating in connection therewith and on an axis coincident with the axis of the bending body, said sheave having a groove the walls of which extend straight in from the periphery a slight distance and are continued in a curve approximating the curve of the pipe.

12. In a pipe bending machine, the combination of a grooved bending body; and a sheave operating in connection therewith, said sheave having a groove the walls of which extend straight in from the periphery a slight distance and are continued in a curve approximating the curve of the pipe, the bottom of the groove being cut away to a greater depth than the curve of the side walls of the groove continued.

13. In a pipe bending machine, the combination of a bending body; and a grooved sheave operating in connection therewith, said body having a groove therein, the walls of the groove extending straight in from the periphery of the body for a slight distance and continued with a curve approximating the curve of the pipe, the groove being cut away at the bottom to a greater depth than a continuation of the side walls of the groove continued.

14. In a pipe bending machine, the combination of a bending body; and a sheave operating in connection therewith, said bending body and sheave each having a groove, the walls of which extend straight in from the periphery for a slight distance and are continued with a curve approximating the curve of the pipe, said groove being of a greater depth than the curve of the side walls of the groove continued.

In testimony whereof I have hereunto set my hand.

WILLIAM H. BEERS.